Dec. 10, 1968 C. A. DEHNE 3,415,202
CONVEYOR CONSTRUCTION
Filed Jan. 13, 1966 3 Sheets-Sheet 2

INVENTOR
CLARENCE A. DEHNE
BY
*Farley, Forster & Farley*
ATTORNEYS

Dec. 10, 1968  C. A. DEHNE  3,415,202

CONVEYOR CONSTRUCTION

Filed Jan. 13, 1966  3 Sheets-Sheet 3

INVENTOR
CLARENCE A. DEHNE

BY
Farley, Forster & Farley

ATTORNEYS

United States Patent Office 3,415,202
Patented Dec. 10, 1968

3,415,202
CONVEYOR CONSTRUCTION
Clarence A. Dehne, Orchard Lake, Mich., assignor to Jervis B. Webb Company, a corporation of Michigan
Filed Jan. 13, 1966, Ser. No. 520,468
3 Claims. (Cl. 104—242)

ABSTRACT OF THE DISCLOSURE

A construction for limiting movement of the wheels of a load carrying trolley of a power and free conveyor vertically off the track and for preventing disengagement of the trolley driving dog from a propelling pusher resulting from such rocking movement, wherein a hold-down member is secured to the trolley body below the track and has portions engageable with the track forwardly and rearwardly of the trolley wheels and trolley dogs.

---

The subject matter of this invention is an improved construction for a conveyor which incorporates a device for positively preventing a conveyor trolley from being derailed, these improvements having particular utility in the construction of conveyors of the power and free type in which load carrying trolleys are supported on a track and propelled therealong by engagement between a pusher of an independently supported propelling member and a driving dog on the trolley.

Load carrying trolleys of a power and free conveyor are subject to start and stop operation and are frequently started from rest when engaged by a moving pusher. The reaction to the sudden impact tends to produce a rocking movement of the trolley and a shifting of its wheels out of proper engagement with the supporting track. Such a rocking movement of the trolley may also result from the reaction encountered in traversing upgrades and downgrades. In one type of power and free conveyor, the load carrying trolleys are each provided with a driving dog which is movable between driving and non-driving positions relative to a pusher of the propelling member to facilitate starting and stopping of the carriers and to permit the carriers to be accumulated in banks. With this type of construction the aforementioned rocking movement of the trolley can cause a pusher to exert a component of force which tends to move the trolley driving dog to non-driving position, and resulting in an undesired disengagement of the pusher with the trolley driving dog.

The objects of the present invention are to provide a track and trolley construction including a hold-down member carried by the trolley structure for limiting the extent of possible rocking movement of the trolley and preventing derailment of the trolley and relative disengaging movement between the trolley driving dog and the pusher. The construction may also be employed to provide positive engagement between a pusher and both driving and holdback dogs of a trolley in traversing upgrades and downgrades of a conveyor installation.

Other features and advantages of the improved construction will appear from the following description of the representative embodiments disclosed in the accompanying drawings in which.

Figure 1:
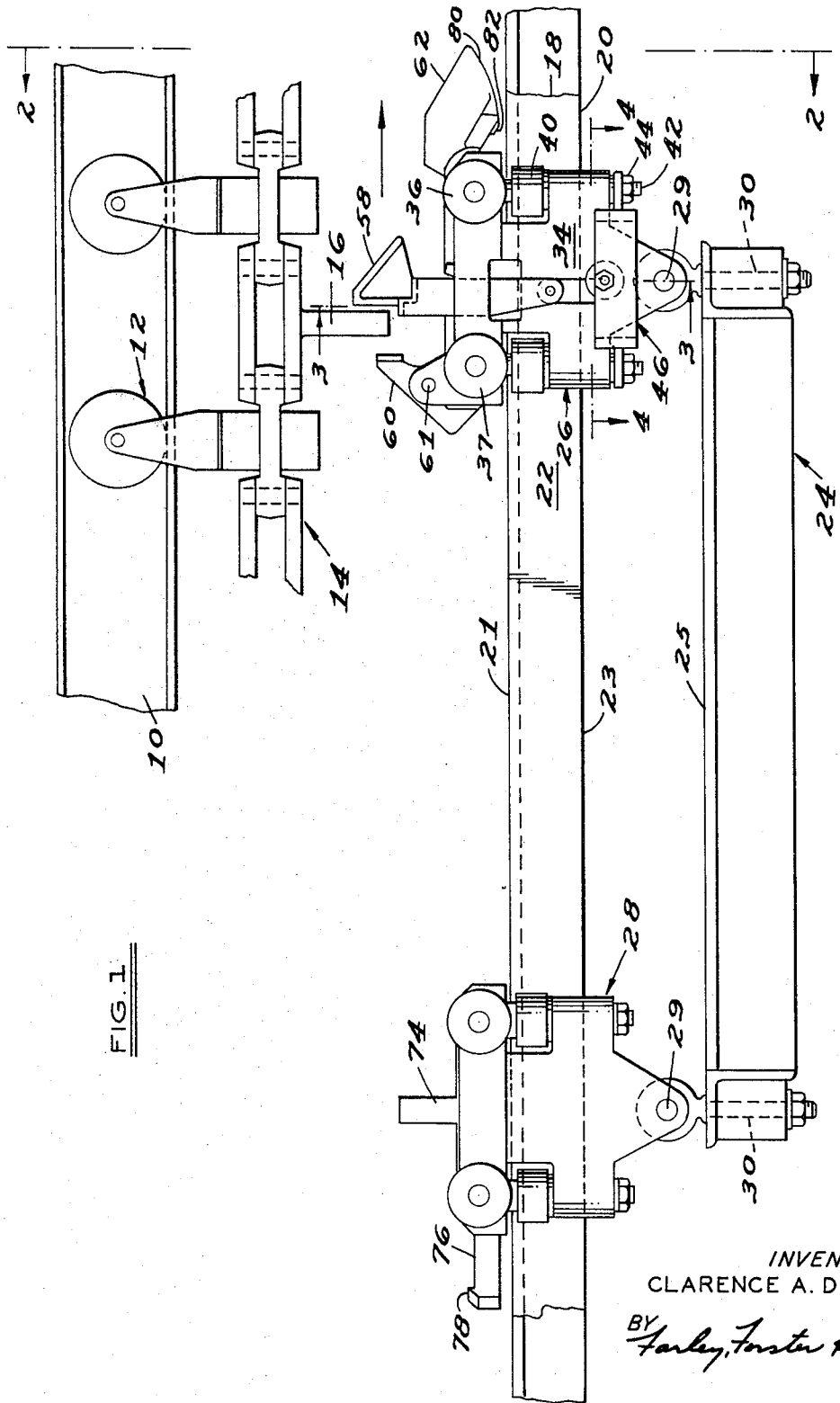
FIGURE 1 is a side elevation showing a load carrier of a power and free conveyor constructed in accordance with one form of the invention.
Figure 2:
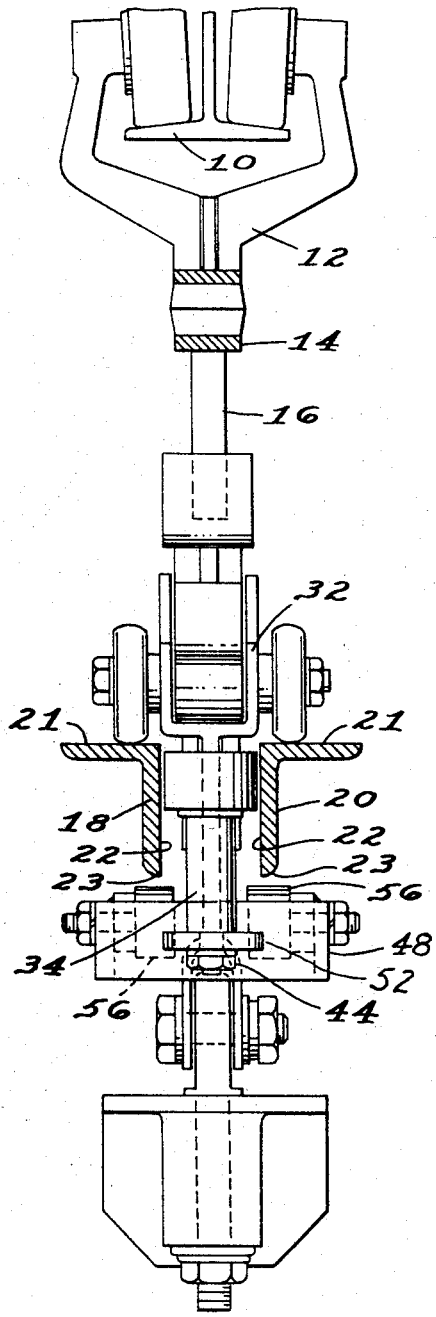
FIGURE 2 is a sectional elevation taken as indicated by the line 2—2 of FIG. 1.
Figure 3:
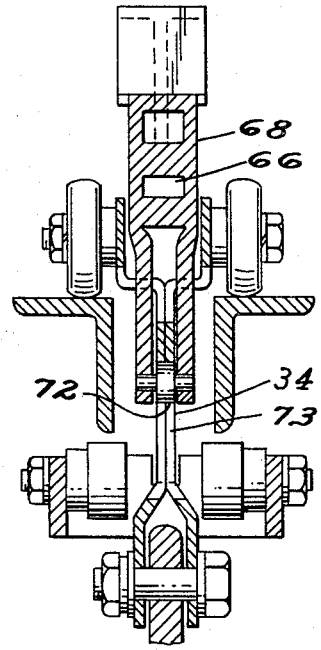
FIGURE 3 is a sectional elevation taken approximately on the line 3—3 of FIG. 1.

The power and free conveyor shown in FIG. 1 includes an upper I beam track 10 for trolleys 12 from which an endless propelling chain 14 is suspended, the chain being provided with depending pushers 16 at spaced intervals. A pair of angle section loading carrying tracks 18 and 20 are mounted below the upper track 10 in vertically centered relation therewith as shown in FIG. 2, the track members 18 and 20 providing a pair of upper track surfaces 21, a pair of vertical guide surfaces 22 and a pair of lower surfaces 23.

These track members 18 and 20 support the load carriers 24 of the conveyor, and in the construction illustrated a load carrier 24 includes a load bar 25 pivotally supported between a front trolley 26 and a rear trolley 28, the pivotal connection providing articulation between the load bar and each trolley on a horizontal axis 29 and a vertical axis 30.

Each front trolley 26 has a body formed by a U-shaped upper portion 32 and a depending portion 34 extending downwardly betwen the guide surfaces 22 of the track members and below the lower surfaces 23 thereof. Pairs of front and rear supporting wheels 36 and 37 are mounted on the upper portion 32 of the trolley body for engagement with the upper track surfaces 21. Each pair of supporting wheels has a guide wheel 40 associated therewith and supported on the depending portion 34 of the trolley body for rotation on a vertical axis between the guide surfaces 22 of the track members. The rotational axis of each guide wheel is defined by an axle pin 42 secured within a boss 43 (FIG. 4) at the ends of the trolley body by a nut 44.

Figure 4:
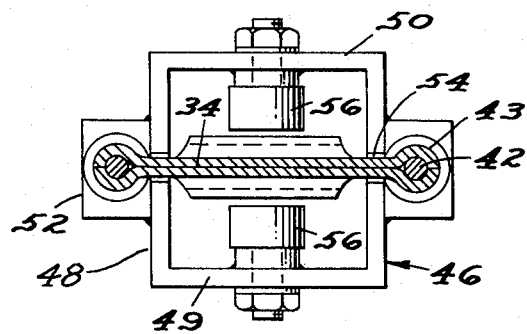
FIGURE 4 is a sectional plan view taken on the line 4—4 of FIG. 1.

A hold-down member 46 is secured to the depending portion 34 of the trolley body by the axle pins 42 and the nuts 44. This hold-down member as best shown in FIG. 4, consists of a rectangular, tubular frame 48 including portions 49 and 50 extending to either side of the depending portion 34 of the trolley body below the lower surfaces 23 of the track members 18 and 20. The frame is provided with attaching lugs 52 projecting from the ends thereof for receiving the axle pins 42, with slots 54 straddling the lower portion 34 of the trolley body, and with track engaging means in the form of rollers 56. When the hold-down member 46 is assembled to the trolley body, the track engaging rollers 56 have a normal clearance relation with the lower surfaces 23 of the track members 18 and 20, this clearance being less than the maximum depth of engagement of the guide wheels 40 below the supporting surfaces 21 of the track members.

The front trolley 26 is also equipped with a driving dog 58 and a hold-back dog 60 spaced apart longitudinally of the trolley so that the pusher 16 can be trapped between the two dogs. The hold-back dog 60 is mounted on a pivot 61 and has a one-way action; the driving dog 58 is mounted for vertical movement between a driving and a non-driving position relative to the pusher 16 in response to pivotal movement of a releasing lever 62 mounted on the front wheel axle and which has a forwardly projecting portion and a rearwardly projecting portion 64 including a tang 65 (FIG. 5) engaging a slot 66 in a downwardly extending portion 68 of the driving dog. The driving and non-driving positions of the driving dog and releasing lever are shown in full line and broken line respectively in FIG. 5, with movement of the driving dog being constrained by a guide block 70 on the trolley body and by a roller 72 on the driving dog which engages a slot 73 in the lower portion 34 of the trolley body.

Figure 5:
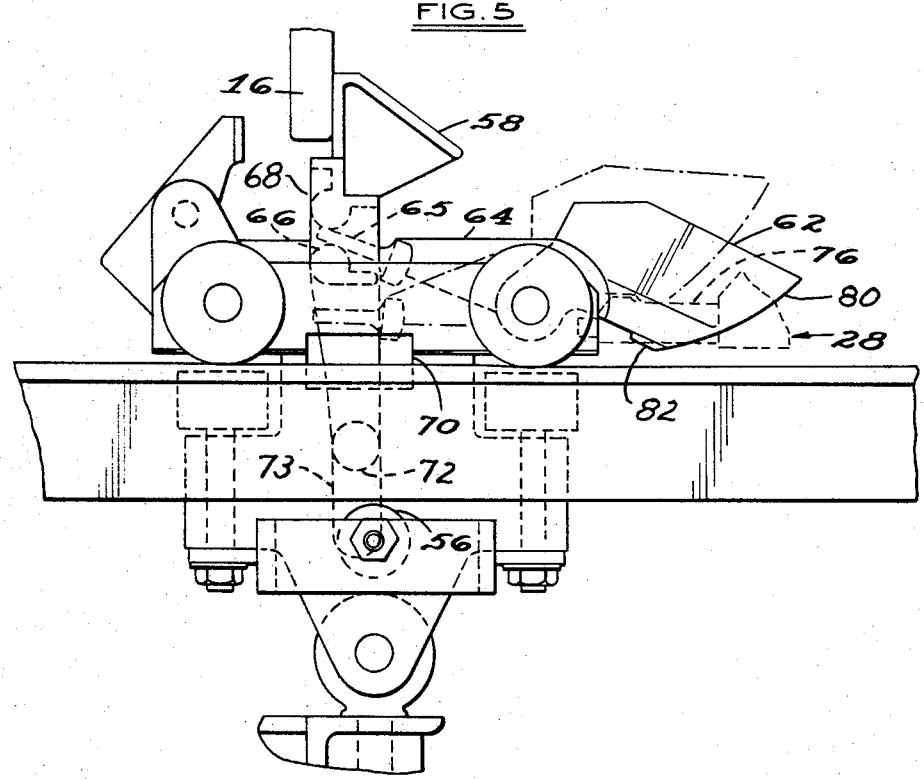
FIGURE 5 is a fragmentary side elevation showing the leading trolley of the carrier of FIG. 1 on an enlarged scale.

The rear trolley 28 is similar in construction except that a single rigid driving dogs 74 is provided along with a rearwardly projecting bumper cam 76 which operates the releasing lever 62 of a following carrier, as shown in FIG. 5, and which has an enlarged upwardly projecting end 78 co-acting with a cam surface 80 on the releasing lever 62 and with a downward projection 82 thereon to minimize rebounding motion when a carrier overtakes a preceding stopped carrier. No hold-down member is installed on the rear trolley 28, in view of the fact that this trolley is equipped with a rigid auxiliary dog 74, but the hold-down member may be employed if desired.

Figure 6:
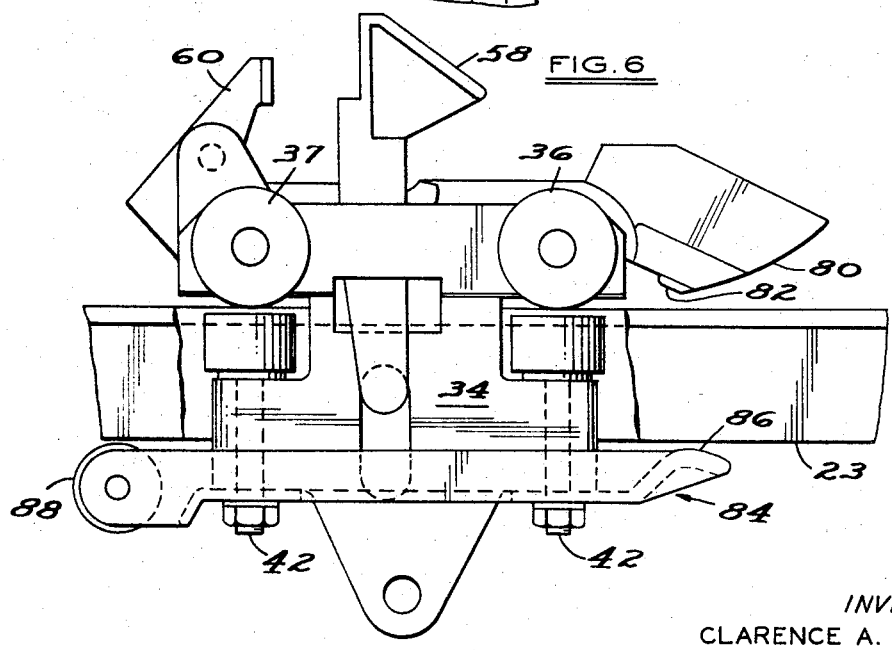
FIGURE 6 is an elevation similar to FIG. 5 showing a modified form of construction.

Referring to FIG. 6 the trolley shown therein is similar in all respects to the front trolley 26 of FIGS. 1–5 except for the hold-down member 84 installed thereon. This hold-down member 84 is also secured to the depending portion 34 of the trolley body on the guide wheel axle pins 42 and includes track engaging means in the form of a surface 86 located forwardly and below the front trolley wheels 36 and adapted to slidably contact the lower track surfaces 23, and a roller 88 located below and rearwardly of the rear trolley wheels 37.

In the construction of FIGS. 1–5 the track engaging roller means 56 is located vertically intermediate the front and rear supporting wheels 36 and 37 of the trolley and in vertically aligned relation with the driving dog 58. This positioning of the track engaging means of the hold-down member, together with the minimum clearance relation to the lower track surfaces 23, resists rocking movement of the trolley resulting from the reaction between the pusher 16 and driving dog 58 and positively prevents derailment of the trolley or rocking movement thereof sufficient to cause the pusher 16 to exert a component of force on the driving dog tending to move or cam it to a non-driving position. In the construction of FIG. 6 rocking movement of the trolley such as to cause a camming action between a pusher and the driving dog 58 is further resisted by the roller means 88 of the hold-down member 84 and the location thereof rearwardly and below the driving dog 58. Rocking movement of the trolley such as could be produced in traversing a downgrade from the reaction between a pusher and the holdback dog 60, is positively resisted by the track engaging portion 86 of the hold-down member and the location thereof forwardly and below the hold-back dog 60. The sliding engagement of the portion 86 with the lower track surfaces 23 also exerts a braking action on the trolley tending to minimize the reaction between the hold-back dog 60 and a pusher. Hence use of the construction shown in FIG. 6 may be preferable in installations incorporating vertical changes in direction.

I claim:

1. A conveyor construction comprising parallel horizontally spaced track members providing a pair of upper track surfaces, a pair of vertical guide surfaces and a pair of lower surfaces; a trolley having a body, pairs of spaced front and rear supporting wheels mounted thereon for engagement with said upper track surfaces, the body including a portion extending downwardly between the guide surfaces of the track members and below the lower surfaces thereof; guide wheels associated with the front and rear supporting wheels and means mounting each guide wheel on the downwardly extending portion of the trolley body for rotation on a vertical axis between the guide surfaces of the track members; a hold-down member secured to the downwardly extending portion of the trolley body and extending to either side thereof below the lower surfaces of the track members; said hold-down member having front and rear track engaging means engageable with the lower surfaces of the track member forwardly and rearwardly respectively of the contact of said front and rear trolley supporting wheels the upper track surfaces, said front track engaging means being formed by a surface adapted for sliding engagement with the lower surfaces of the track members, said rear track engaging means comprising roller means carried by the hold-down member, and said front and rear track engaging means having a normal clearance relation with the lower surfaces of the track members less than the maximum depth of engagement of the guide wheels and said guide surfaces below said supporting surfaces whereby alignment between the supporting wheels and supporting surfaces of the track members is maintained in the event the supporting wheels are shifted upwardly out of engagement with said supporting surfaces.

2. A conveyor construction of the type having a track supporting an endless propelling member equipped with pushers, a load supporting track having upper and lower surfaces, a trolley having wheels engaging the upper track surfaces, a holdback dog, a driving dog, and means for moving the driving dog between driving a non-driving positions relative to a pusher, characterized by means for preventing the driving dog from moving to a non-driving position in response to engagement by a pusher comprising a hold-down member secured to the trolley and extending longitudinally of the trolley below the lower surface of the load supporting track, said hold-down member having a front portion disposed vertically below and forwardly of the trolley driving dog in the driving position thereof and a rear portion disposed vertically below and rearwardly of the holdback dog, at least one of said front and rear poritons of the hold-down member being engageable with the lower surface of the load supporting track in the event of rocking movement of the trolley resulting from engagement of one of said driving and holdback dogs by a pusher.

3. A conveyor construction according to claim 2 wherein said front portion of the hold-down member includes a surface adapted to slidably engage the lower surface of the load supporting track and the said rear portion includes a roller engageable with said lower track surface.

References Cited

UNITED STATES PATENTS

| | | | |
|---|---|---|---|
| 1,613,866 | 1/1927 | Avery | 104—242 |
| 1,713,459 | 5/1929 | Withyman | 104—248 |
| 3,194,177 | 7/1965 | Bishop | 104—172 |

ARTHUR L. LA POINT, *Primary Examiner.*

D. F. WORTH, *Assistant Examiner.*